United States Patent Office 3,364,242
Patented Jan. 16, 1968

3,364,242
SEPARATION OF GOSSYPOL FROM
COTTONSEED OIL
Robert J. Johnson, Chicago, and Frank A. Norris, La Grange, Ill., assignors to Swift & Company, Chicago, Ill., a corporation of Illinois
No Drawing. Filed July 5, 1963, Ser. No. 293,132
6 Claims. (Cl. 260—420)

This invention relates to the treatment of gossypol-containing materials to remove the gossypol from such materials and, more particularly, to the removal and recovery of gossypol from fatty compositions. The invention is also concerned with the production of gossypol-aldehyde derivatives.

The pigments of cottonseed include as a major component thereof the complex polyphenolic dicarbonyl compound identified as gossypol. Gossypol is found in the pigment gland of cottonseed and because this and related pigments appear to be toxic to non-ruminant animals, most of the attention of prior investigators has been directed to the elimination of gossypol, degradation of gossypol, or conversion of this pigment to the nontoxic form. The chemistry of the pigments of cottonseed, and specifically gossypol, is summarized in Cottonseed and Cottonseed Products, Interscience Publishers Incorporated, New York (1948), pages 213–363. The gossypol content of cottonseed has been reported to be about ½ to 1½ percent in cottonseed and although seeds are often treated to detoxify gossypol, some gossypol is usually carried along with the oil which is removed from cottonseed. Thus, cottonseed oil and cottonseed oil foots, both raw and acidulated, contain appreciable proportions of free gossypol.

Additionally, while some attention has been directed by some prior art investigators to finding practical uses for gossypol and related cottonseed pigments, these materials have not been found to be particularly useful.

Crude cottonseed oil contains small amounts of gossypol and related pigments with the amount depending upon the method of obtaining the crude oil. Thus, hydraulic press oil has been reported to contain about 0.02–0.11 percent gossypol and screw pressed oil about 0.25–0.47 percent gossypol. The amount of gossypol in solvent extracted oils ranges from about 0.05–0.42 in hexane extracted oils to about 1.25–1.43 percent in oils which are extracted with acetone, ethyl ether or methyl ethyl ketone. Practically all of the gossypol in crude oil is in the free form. Cottonseed oil foots for both the soap stocks and acidulated foots may contain proportionally larger amounts of gossypol because of the concentration of gossypol resulting from the refining operations.

It is an object of this invention to provide a method for the removal of gossypol from gossypol-containing fatty materials in a manner which avoids degradation of the gossypol.

Another object of this invention is the provision of a method for preparing a gossypol-aldehyde composition from liquid gossypol-containing materials such as cottonseed oil, cottonseed oil foots and isolated cottonseed pigment compositions.

Still another object of the invention is to provide a method for converting dissolved free gossypol to the insoluble form in liquid fatty acids and fatty acid esters containing such gossypol.

Yet another object of the invention is the provision of an improved procedure for detoxifying cottonseed oil containing gossypol and recovering a gossypol-aldehyde product.

Additional objects of the invention, if not specifically set forth herein, will be readily apparent to those skilled in the art from the detailed description of the invention which follows.

Generally, the invention comprises the treatment of gossypol-containing liquids with aldehydes to convert the gossypol from the soluble to the insoluble form and recovery of the insolubilized gossypol-aldehyde product from the liquid. The gossypol-containing fatty material is contacted with an aldehyde which is devoid of alpha hydrogen and a gossypol-aldehyde product which is insoluble in the liquid is formed. This insoluble material may be recovered by centrifugation, filtration or other conventional methods and a substantially gossypol-free oil, as well as a valuble gossypol-aldehyde derivative is obtained. In the formation of the gossypol-aldehyde product, the identity of the gossypol is maintained and a novel organic chemical which is useful in the preparation of thermosetting resins is produced.

More particularly, the invention involves the treatment of free gossypol-containing fatty acids and fatty acid esters such as are found in cottonseed oil and cottonseed oil foots with an aliphatic, aromatic, alicyclic or heterocyclic aldehyde which is substantially free of alpha hydrogen so as to combine the gossypol with the aldehyde and form a gossypol derivative which is insoluble in the oil or foots. Only a small amount of the aldehyde is required to substantially degossypolize the cottonseed oil or foots and the aldehyde can be employed in the form of a solid, liquid or gas. Usually, at least about a stoichiometric amount of aldehyde based upon the amount of gossypol present in the gossypol-containing composition will be employed and it is preferred that a slight excess of the aldehyde be used to insure that the maximum amount of gossypol be removed from the gossypol-containing substance. Since the amount of gossypol present in gossypol-containing materials is comparatively small, usually, not exceeding about 1.5% in the oil and not exceeding about 4% in the cottonseed foots, it is ordinarily unnecessary to use more than about 3–8% aldehyde on a weight basis in treating cottonseed oil or cottonseed oil foots containing gossypol to remove a substantial proportion of the gossypol from the oil or foots. Aldehydes which are employed in the formation of the aldehyde-gossypol product include those aldehydes which are identified chemically as having no alpha hydrogen substitution. Aliphatic mono- and dialdehydes such as formaldehyde, trimethyl acetaldehyde, chloral, and glyoxal are, thus, very satisfactory for use in the method of the invention. The lower 1–7 carbon alkyl derivatives of glyoxal such as methyl glyoxal can also be employed. Suitable aromatic aldehydes which are devoid of alpha hydrogen and can be employed in the process include benzenoid aldehydes and nuclear-substituted benzenoid aldehydes such as benzaldehyde, anisaldehyde, tolualdehydes, salicylaldehyde, vanillin, orthovanillin, isovanillin, and piperonal. Other aromatic aldehydes such as naphthaldehyde and aromatic dialdehydes such as phthaldehyde also form valuable derivatives with gossypol. Heterocyclic aldehydes of both the aromatic and alicyclic type such as nicotinaldehyde and furfural are also useful in the process of the invention. Mixtures of these aldehydes which are free of alpha hydrogen substitution can also be employed in the recovery of the aldehyde-gossypol products of the present invention.

All the aforementioned aldehydes can be characterized structurally as being free of hydrogen substitution on the carbon adjacent to the aldehyde group. Thus, while benzaldehyde can be used very satisfactorily in the production of the gossypol-aldehyde products of the invention, cinamaldehyde, because of the presence of available hydrogen atoms on the carbon adacent to the aldehyde group, is unsatisfactory. Similarly, while chloral can be employed to form valuable chloral-gossypol derivatives, acetaldehyde, because of the presence of available hydrogen atoms on the carbon adjacent to the aldehyde group in a straight chain, cannot be employed.

Conditions under which the aldehyde-gossypol derivative is formed can be varied considerably, depending upon the requirements with respect to permissible time of reaction and the particular aldehyde being employed in the process. Thus, some aldehydes are more reactive than others and the reaction can be carried out at room temperature or below, provided long reaction times can be tolerated. The reaction is more rapid at elevated temperatures of about 50° C.–200° C., with the upper limitation on the degree of temperature permissible being that temperature at which the materials being treated will be adversely affected by heat. In the case of cottonseed oil and cottonseed oil foots, the mixtures usually not heated above about 225° C.

The following examples illustrate the manner in which the invention may be practiced. It is to be understood that the procedures described in the examples are merely illustrative and are not intended to be limiting on the invention.

Example I 1,000 grams of crude cottonseed oil containing 0.40% gossypol was placed in a 2-liter, round-bottomed flask equipped with an agitator, a heating mantle, a fritted glass dispersion tube, and a thermometer. The oil was stirred and heated to 200° C. and anhydrous formaldehyde gas was bubbled through the heated, stirred oil for 1 hour. The oil was then cooled to room temperature and was allowed to stand at room temperature for about 16 hours. The oil containing a gossypol-formaldehyde precipitate was filtered through a Büchner funnel and the gossypol-formaldehyde adduct which remained was a yellowish-brown, infusible solid. The gossypol content of the filtrate was 0.05%.

Example II 3,300 grams of crude cottonseed oil having a gossypol content of 0.06% was mixed with 1% by weight of trioxymethylene in a high-speed mixer for 5 minutes. The finely powdered trioxymethylene was substantially insoluble in the oil and the mixture was agitated at a rate sufficient to maintain intimate mixing of the trioxymethylene with the oil for a period exceeding about 4 minutes. The oil temperature at the completion of the high-speed mixing was 50° C. The mixture was allowed to stand at room temperature for 16 hours, and then filtered. The crude oil obtained as the filtrate contained 0.04% gossypol and the residue on the filter was a mixture of the methylol derivative of gossypol and some unreacted trioxymethylene. The trioxymethylene was separated from the methylol-gossypol derivative by heating at 115° C. for 1 hour to boil off the excess trioxymethylene.

Example III 1 gallon of crude cottonseed oil containing 0.09% gossypol was mixed with 10 grams of benzaldehyde. The mixture was allowed to stand at room temperature with occasional stirring for approximately 1 month. At the end of this time, the benzaldehyde-gossypol precipitate which had formed was removed by filtration. The recovered oil filtrate was substantially free of gossypol.

Example IV 100 grams of crude cottonseed oil containing 1.30% gossypol was heated, while being stirred, a temperature of 157° C. in a reaction vessel. The vapors of boiling glyoxal were passed through the heated, agitated cottonseed oil beneath the surface thereof for a period of 2 hours. During this time, a precipitate formed in the reaction mixture. The mixture was cooled to room temperature and centrifuged 5,000 r.p.m. for 30 minutes. The supernatant, clear liquid was decanted and was found to contain no more than about 0.13% gossypol. The precipitated glyoxal-gossypol adduct was a yellowish-brown, infusible solid.

Example V 50 gallons of crude cottonseed oil having 0.10% gossypol was placed in a stainless steel, open-head, 55-gallon drum equipped with a Lightning mixer, and a high-pressure (200 p.s.i.) steam coil. Steam was passed through the coil until the temperature of the oil reached 100° C. The heated oil was then agitated and 1 pint of furfural was added, while agitating and heating. The temperature was maintained at 100° C. for 1 hour and then raised to 190° C. and held at this temperature for 30 minutes to remove excess furfural by distillation. The reaction mixture was then cooled and permitted to remain quiescent at room temperature for 16 hours, followed by filtration through a vacuum filter. The gossypol-furfural adduct retained on the filter amounted to 154 grams. The gossypol content of the treated oil was less than 0.02%.

The gossypol-aldehyde product can be prepared from gossypol-containing cottonseed oil or gossypol-containing cottonseed oil foots, as well as from isolated gossypol mixtures.

Gossypol may be isolated from cottonseed oil or from cottonseed by forming ether-insoluble compounds produced by reacting gossypol in ether solution with acetic acid, with aniline or sodium hydroxide. Each of these three ether-insoluble derivatives has been utilized in isolating substantially quantities of gossypol from ether extracts of cottonseed. Formation of the aldehyde-gossypol product from such isolated gossypol mixtures is very expensive however.

The gossypol-aldehyde reaction product can be utilized in the production of thermo-setting resins and, also, as a component in resins utilized in the foundry industry.

We claim:

1. A process for treating gossypol-containing cottonseed oil products to remove gossypol from said oil comprising: contacting said oil with an aldehyde free from alpha hydrogen substitution in an amount sufficient to form an oil-insoluble gossypol-aldehyde complex and separating said complex from the substantially gossypol-free oil.

2. A process for recovering a gossypol-aldehyde complex from cottonseed oil cottonseed oil containing gossypol comprising: contacting said oil with at least a stoichiometric amount based on the amount of gossypol present in said oil of an aldehyde which is free of alpha hydrogen substitution and separating the oil-insoluble gossypol-aldehyde adduct from said oil.

3. A process for recovering a gossypol-aldehyde complex from esters of higher fatty acids found in cottonseed oil products containing gossypol comprising: contacting said esters with at least a stoichiometric amount based on the gossypol content of said esters of an aldehyde which is devoid of alpha hydrogen substitution, heating the mixture to a temperature of about 10–225° C. whereby to form an insoluble precipitate in said esters and recovering said insoluble precipitate from said degossypolized esters.

4. The method of claim 3 wherein the aldehyde is an aliphatic aldehyde.

5. The method of claim 3 wherein the aldehyde is an aromatic aldehyde.

6. The method of claim 3 wherein the aldehyde is a mixture of aldehydes which are free of alpha hydrogen substitution.

References Cited

UNITED STATES PATENTS 2,258,672  10/1941  Buxton et al. _____ 260—420

OTHER REFERENCES

Bailey et al.: Cottonseed, Interscience Publishers Inc., New York, 1948, p. 223.

HENRY JILES, *Primary Examiner.*

ALEX MAZEL, *Examiner.*

C. P. PARKER, A. H. SUTTO, *Assistant Examiners.*